US012786793B2

(12) United States Patent
Lee et al.

(10) Patent No.: US 12,786,793 B2
(45) Date of Patent: Nov. 3, 2026

(54) METHOD AND DEVICE FOR PREDICTING COMMUNICATION NETWORK LOAD AND PERFORMING LOAD BALANCING IN WIRELESS COMMUNICATION SYSTEM

(71) Applicant: Samsung Electronics Co., Ltd., Suwon-si (KR)

(72) Inventors: Hyungho Lee, Suwon-si (KR); Gyusu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 17/906,967

(22) PCT Filed: Mar. 22, 2021

(86) PCT No.: PCT/KR2021/003472

§ 371 (c)(1),
(2) Date: Sep. 21, 2022

(87) PCT Pub. No.: WO2021/194176

PCT Pub. Date: Sep. 30, 2021

(65) Prior Publication Data

US 2023/0105308 A1 Apr. 6, 2023

(30) Foreign Application Priority Data

Mar. 23, 2020 (KR) ........................ 10-2020-0035118

(51) Int. Cl.
*H04W 28/08* (2023.01)

(52) U.S. Cl.
CPC ....... *H04W 28/0958* (2020.05); *H04W 28/08* (2013.01)

(58) Field of Classification Search
CPC . H04W 28/0958; H04W 28/08; H04W 24/02; H04W 24/10; H04W 88/08;
(Continued)

(56) References Cited

U.S. PATENT DOCUMENTS 6,816,732 B1 * 11/2004 Farley ............... H04W 28/0861 455/434
9,756,518 B1 * 9/2017 Sheen .................. H04W 16/18
(Continued)

FOREIGN PATENT DOCUMENTS

JP 6315202 B2 4/2018
KR 10-2012-0103752 A 9/2012
KR 10-2015-0021561 A 3/2015

OTHER PUBLICATIONS

International Search Report and Written Opinion of the International Searching Authority dated Jun. 24, 2021, in connection with International Application No. PCT/KR2021/003472, 11 pages.
(Continued)

*Primary Examiner* — Mohammed S Chowdhury
*Assistant Examiner* — Muhammad Ainul Huda

(57) ABSTRACT

The present disclosure relates to a 5th generation (5G) or pre-5G communication system for supporting a higher data transmission rate after a 4th generation (4G) communication system such as long-term evolution (LTE). According to various embodiments of the present disclosure, a method performed by a server in a wireless communication system may include receiving key performance index (KPI) information, cell coverage information and service quality information of a base station of a sector managed from a KPI data base (DB), a cell coverage DB, and a service quality DB, generating a predicted KPI, predicted cell coverage and predicted service quality information of the base station of the sector based on the KPI information, the cell coverage information and the service quality information, predicting whether a load imbalance occurs including the base station of the sector based on the predicted KPI, the predicted cell coverage and the predicted service quality information, determining a load balance (LB) parameter rule set including one or more predicted LB parameters based on predict-
(Continued)

ing whether the load imbalance occurs, and transmitting the LB parameter rule set to the base station of the sector is provided.

11 Claims, 9 Drawing Sheets

(58) Field of Classification Search
CPC . H04W 88/18; H04W 28/0942; H04W 16/18; H04W 24/04; H04W 24/08; H04W 16/22; H04W 28/0808; H04W 28/0861; H04W 28/0247; H04W 72/52; H04W 36/22; Y02D 30/70
See application file for complete search history.

(56) References Cited

U.S. PATENT DOCUMENTS

| | | | | |
|---|---|---|---|---|
| 9,900,790 | B1 | 2/2018 | Sheen et al. | |
| 10,299,165 | B2 | 5/2019 | Papadopoulos et al. | |
| 10,897,424 | B1 * | 1/2021 | Dhanabalan | H04L 45/306 |
| 2012/0082044 | A1 * | 4/2012 | Lysejko | H04W 24/02 370/252 |
| 2013/0039196 | A1 | 2/2013 | Bodog et al. | |
| 2013/0143561 | A1 * | 6/2013 | Nuss | H04W 24/02 455/436 |
| 2013/0324076 | A1 | 12/2013 | Harrang | |
| 2014/0120930 | A1 | 5/2014 | Harris et al. | |
| 2015/0141027 | A1 | 5/2015 | Tsui et al. | |
| 2017/0064591 | A1 * | 3/2017 | Padfield | H04W 36/0088 |
| 2017/0325138 | A1 * | 11/2017 | Da Silva | H04W 36/302 |
| 2017/0367011 | A1 | 12/2017 | Ekemark et al. | |
| 2018/0077061 | A1 * | 3/2018 | Horn | H04L 45/64 |
| 2018/0196900 | A1 | 7/2018 | Weissman et al. | |
| 2019/0159048 | A1 * | 5/2019 | Feldkamp | H04L 41/149 |
| 2020/0059815 | A1 * | 2/2020 | Nuss | H04W 28/0808 |
| 2021/0168684 | A1 * | 6/2021 | Kang | H04W 36/22 |
| 2022/0377610 | A1 * | 11/2022 | Garcia | H04L 5/0062 |

OTHER PUBLICATIONS

Office Action dated Jun. 19, 2025, in Connection with Korean Application No. 10-2020-0035118, 9 pages.
Notice of Patent Grant dated Feb. 21, 2026, in connection with Korea Application No. 10-2020-0035118, 4 pages.

* cited by examiner

METHOD AND DEVICE FOR PREDICTING COMMUNICATION NETWORK LOAD AND PERFORMING LOAD BALANCING IN WIRELESS COMMUNICATION SYSTEM

CROSS-REFERENCE TO RELATED APPLICATIONS

This application is a 371 National Stage of International Application No. PCT/KR2021/003472, filed Mar. 22, 2021, which claims priority to Korean Patent Application No. 10-2020-0035118, filed Mar. 23, 2020, the disclosures of which are herein incorporated by reference in their entirety.

BACKGROUND

1. Field

The present disclosure generally relates to a wireless communication system, and more particularly, to a method and an apparatus for predicting a communication network load and performing load balancing in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non7 orthogonal multiple access (NOMA), and sparse code multiple access (SCMA) as advanced access technologies.

SUMMARY

Based on the discussions described above, the present disclosure provides a method and an apparatus for predicting a communication network load and performing load balancing in a wireless communication system.

According to various embodiments of the present disclosure, a method performed by a server in a wireless communication system may include receiving key performance index (KPI) information, cell coverage information and service quality information of a base station of a sector managed from a KPI data base (DB), a cell coverage DB, and a service quality DB, generating a predicted KPI, predicted cell coverage and predicted service quality information of the base station of the sector based on the KPI information, the cell coverage information and the service quality information, predicting whether a load imbalance occurs with respect to the base station of the sector based on the predicted KPI, the predicted cell coverage and the predicted service quality information, determining a load balance (LB) parameter rule set including one or more predicted LB parameters based on predicting whether the load imbalance occurs, and transmitting the LB parameter rule set to the base station of the sector.

According to various embodiments of the present disclosure, a method performed by a base station of a sector in a wireless communication system may include receiving an LB parameter rule set comprising one or more predicted LB parameters, a list of parameters for verifying whether an error occurs and a verification error threshold for each parameter from a server, monitoring a KPI, generating a prediction error occurrence report comprising information of a predicted LB parameter of which a difference from an actual monitoring result exceeds the verification error threshold among the one or more predicted LB parameters, based on the monitoring result, and transmitting the prediction error occurrence report to the server.

According to various embodiments of the present disclosure, a server in a wireless communication system may include a transceiver and at least one processor, wherein the at least one processor is configured to receive KPI information, cell coverage information and service quality information of a base station of a sector managed from a KPI DB, a cell coverage DB and a service quality DB, generate a predicted KPI, predicted cell coverage, and predicted service quality information of the base station of the sector based on the KPI information, the cell coverage information, and the service quality information, predict whether a load imbalance occurs in respect to the base station of the sector based on the predicted KPI, the predicted cell coverage and the predicted service quality information, determine an LB parameter rule set including one or more predicted LB parameters based on predicting whether the load imbalance occurs, and transmit the LB parameter rule set to the base station of the sector.

An apparatus and a method according to various embodiments of the present disclosure, may efficiently use a memory or a computation power of a load balance (LB) server, by means of an LB managed sector select function. Hence, each server may support more base stations.

An apparatus and a method according to various embodiments of the present disclosure, may predict accurate load imbalance using past information from various information sources, by means of a load imbalance prediction function. Hence, it is possible to take a preemptive measure before a load imbalance occurs.

An apparatus and a method according to various embodiments of the present disclosure, may detect load imbalance based on a service quality index as well as a key performance index (KPI) of a base station, by means of a load imbalance prediction function.

An apparatus and a method according to various embodiments of the present disclosure, may immediately respond, if an error occurs in prediction through a rule set scheme of an LB parameter selecting function.

An apparatus and a method according to various embodiments of the present disclosure, may update a prediction function and an LB parameter rule selecting function through an error report function of a load parameter rule set monitoring function.

An apparatus and a method according to various embodiments of the present disclosure, may quickly respond if an error occurs through an error report function of a load parameter rule set monitoring function.

Effects obtainable from the present disclosure are not limited to the above-mentioned effects, and other effects which are not mentioned may be clearly understood by those skilled in the art of the present disclosure through the following descriptions.

DETAILED DESCRIPTION

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware approach will be described as an example in various embodiments of the present disclosure to be described hereafter. However, various embodiments of the present disclosure include technology which uses both hardware and software, and accordingly various embodiments of the present disclosure do not exclude a software-based approach.

Terms indicating signals, terms indicating channels, terms indicating control information, terms indicating network entities, and terms indicating components of a device used in the following explanation are illustrated for convenience of description. Accordingly, the present disclosure is not limited to the terms to be described, and other terms having the same technical meaning may be used.

In addition, the present disclosure describes various embodiments using terms used in some communication standard (e.g., 3rd generation partnership project (3GPP)), but this is only an example for description. Various embodiments of the present disclosure may be easily modified and applied in other communication systems.

Figure 1:
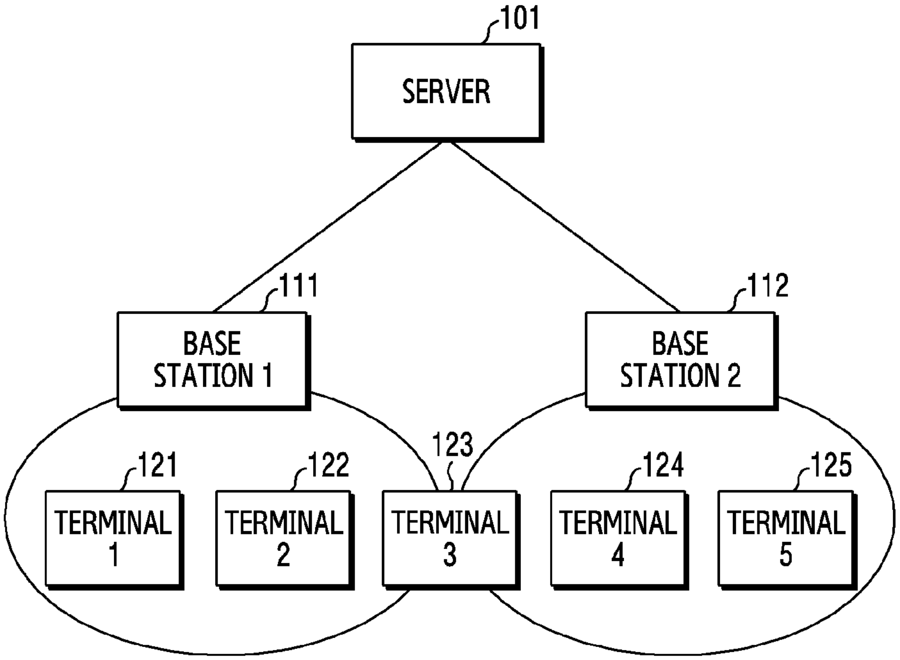
FIG. 1 illustrates a wireless communication system according to various embodiments of the present disclosure.

FIG. 1 illustrates a wireless communication system according to various embodiments of the present disclosure.

FIG. 1 illustrates a server 101, base stations 111 and 112, and terminals 121, 122, 123, 124, and 125, as some of nodes which use radio channels in the wireless communication system. While FIG. 1 shows only one server 101 and two base stations 111 and 112, other servers or base stations identical or similar to the server 101 and the base stations 111 and 112 may be further included.

The server 101 is a node which receives load information of each sector from the base stations 111 and 112 and performs load balancing on the base stations 111 and 112.

The base stations 111 and 112 perform communication of each sector. (hereafter, the sector and the base station are used interchangeably.) The base stations 111 and 112 are a network infrastructure which provides radio access to the terminals 121, 122, 123, 124, and 125. The base stations 111 and 112 have coverage defined as a specific geographical area based on a signal transmission distance. The base stations 111 and 112 may be referred to as, besides the base station, an 'access point (AP)', an eNodeB (eNB)', a '5th generation (5G) node', a 'next generation nodeB (gNB)', a 'wireless point', a 'transmission/reception point (TRP)' or other term having technically identical meaning.

The terminals 121, 122, 123, 124, and 125 each are a device used by a user, and communicate with the base stations 111 and 112 over the radio channel. The terminals 121, 122, 123, 124, and 125 may be referred to as, besides the terminal, a 'user equipment (UE)', a 'mobile station', a 'subscriber station', a 'remote terminal', a 'wireless terminal', or a 'user device' or other term having the equivalent technical meaning.

Figure 2:
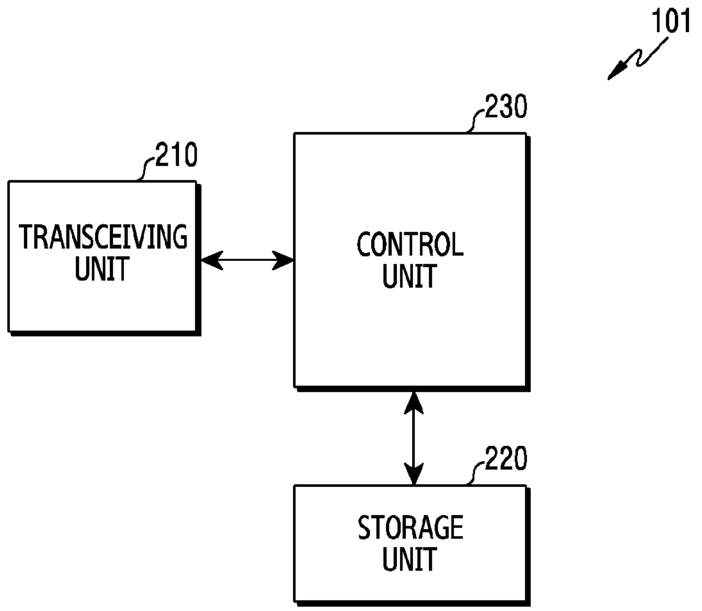
FIG. 2 illustrates a configuration of a server in a wireless communication system according to various embodiments of the present disclosure.

FIG. 2 illustrates a configuration of a server in a wireless communication system according to various embodiments of the present disclosure.

The configuration illustrated in FIG. 2 may be understood as a configuration of a server 101. A term such as '~unit' or '~er' used hereafter indicates a unit for processing at least one function or operation, and may be implemented using hardware, software, or a combination of hardware and software.

Referring to FIG. 2, the server 101 includes a transceiving unit 210, a storage unit 220, and a control unit 230.

The transceiving unit 210 transmits and receives signals. Hence, whole or part of the transceiving unit 210 may be referred to as a 'transmitter', a 'receiver' or a 'transceiver'.

The storage unit 220 stores data such as a basic program, an application program, and setting information for the operations of the server. The storage unit 220 may be configured as a volatile memory, a non-volatile memory, or a combination of a volatile memory and a non-volatile memory. In addition, the storage unit 220 provides the stored data at a request of the control unit 230.

The control unit 230 controls general operations of the server. For example, the server transmits and receives signals through the transmitting unit 210 under control of the control unit 230. In addition, the control unit 230 records and reads data in the storage unit 220. The control unit 240 may include at least one processor.

Figure 3:
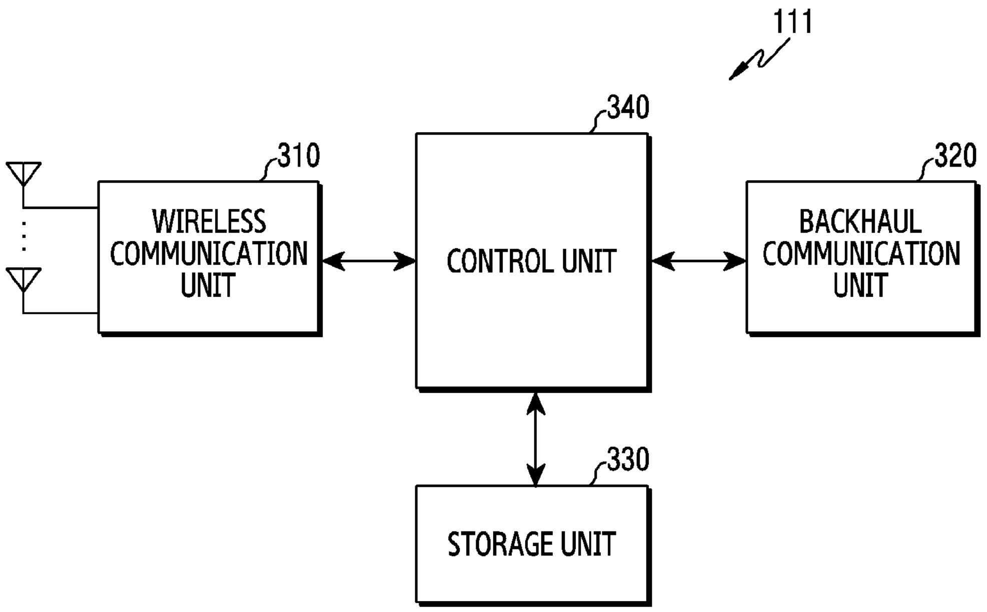
FIG. 3 illustrates a configuration of a base station in a wireless communication system according to various embodiments of the present disclosure.

FIG. 3 illustrates a configuration of a base station in a wireless communication system according to various embodiments of the present disclosure.

The configuration illustrated in FIG. 3 may be understood as a configuration of a base station 111. A term such as '~unit' or '~er' used hereafter indicates a unit for processing at least one function or operation, and may be implemented using hardware, software, or a combination of hardware and software.

Referring to FIG. 3, the base station 111 includes a wireless communication unit 310, a backhaul communication unit 320, a storage unit 330, and a control unit 340.

The wireless communication unit 310 performs functions for transmitting and receiving signals over a radio channel. For example, the wireless communication unit 310 performs a function of converting a baseband signal and a bit stream according to a physical layer standard of the system. For example, in the data transmission, the wireless communication unit 310 generates complex symbols by encoding and modulating a transmit bit stream. In addition, in the data reception, the wireless communication unit 310 restores a received bit stream by demodulating and decoding a baseband signal.

In addition, the wireless communication unit 310 up-converts a baseband signal into a radio frequency (RF) band signal and then transmits it over an antenna, and down-converts an RF band signal received over the antenna into a baseband signal. For doing so, the wireless communication unit 310 may include a transmit filter, a receive filter, an amplifier, a mixer, an oscillator, a digital to analog converter (DAC), an analog to digital converter (ADC), and the like. Also, the wireless communication unit 310 may include a plurality of transmit and receive paths. Further, the wireless communication unit 310 may include at least one antenna array including a plurality of antenna elements.

The wireless communication unit 310 transmits and receives the signals. Accordingly, whole or part of the wireless communication unit 310 may be referred to as a 'transmitter', a 'receiver' or a 'transceiver'.

The backhaul communication unit 320 provides an interface for communicating with other nodes in the network. That is, the backhaul communication unit 320 converts a bit string transmitted from the base station to other node, for example, other access node, other base station, an upper node including the server 301, a core network, and so on into a physical signal, and converts a physical signal received from other node into a bit string.

The storage unit 330 stores data such as a basic program, an application program, and setting information for the operations of the base station. The storage unit 330 may be configured with a volatile memory, a non-volatile memory, or a combination of a volatile memory and a non-volatile memory. In addition, the storage unit 330 provides the stored data at a request of the control unit 340.

The control unit 340 controls general operations of the base station. For example, the control unit 340 transmits and receives a signal through the wireless communication unit 310 or the backhaul communication unit 320. In addition, the control unit 340 records and reads data in the storage unit 330. In addition, the control unit 340 may perform functions of a protocol stack required by the communication standard. According to another implementation, the protocol stack may be included in the wireless communication unit 210. For doing so, the control unit 340 may include at least one processor.

Figure 4:
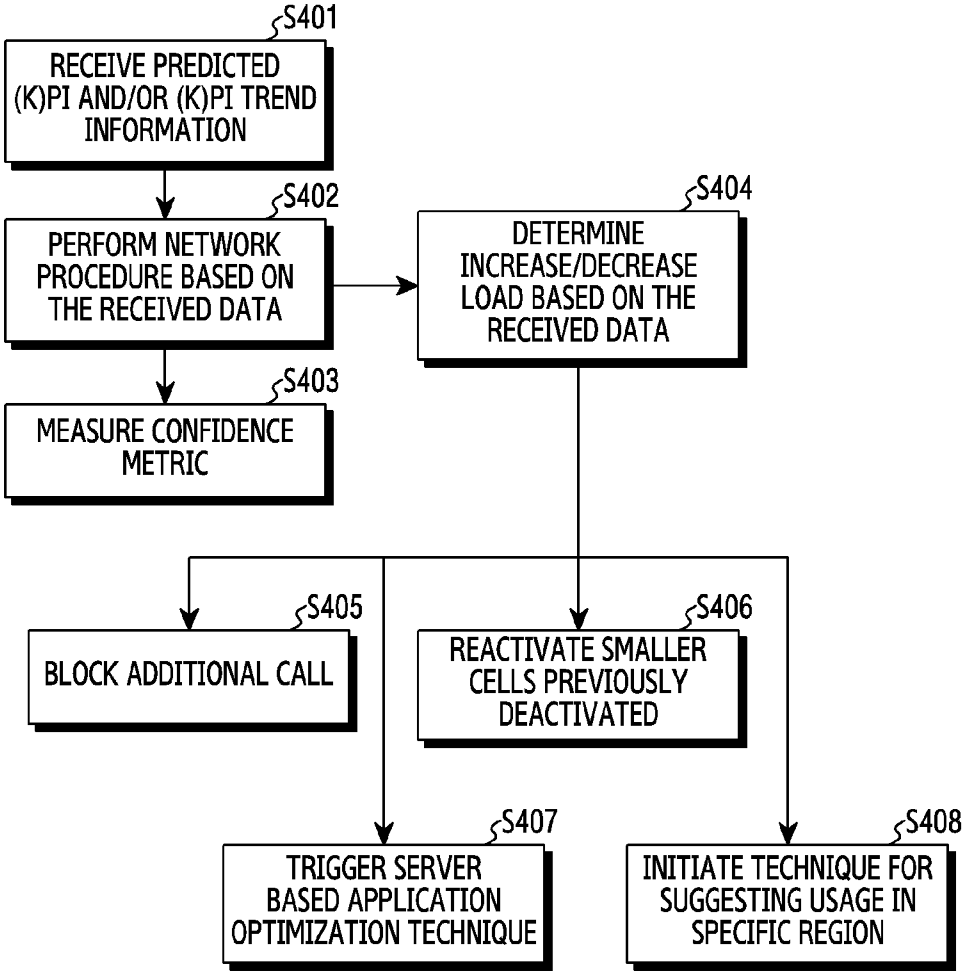
FIG. 4 illustrates an example of a process of performing load balancing in a wireless communication system.

FIG. 4 illustrates an example of a process in which a server performs load balancing in a wireless communication system.

Referring to FIG. 4, in step S401, the server receives a predicted (key) performance index ((K)PI) and/or (K)PI trend information. The (K)PI indicates a (key) performance index. According to an embodiment, the server generates at least one of the predicted performance index or display performance trend information in a first network element. According to an embodiment, the server receives performance index trend information of a second network element from one or more first network elements of at least one predicted performance index.

In step S402, the server performs a network procedure based on the received data. According to an embodiment, the server transmits to the second network element at least one of the predicted performance index or the index performance trend information from the first network element.

In step S403, the server measures a confidence metric. According to an embodiment, the confidence metric is based on at least one of at least one network procedure predicted performance index performed by the second network element or the received performance index trend information.

In step S404, the server determines an increase/decrease load based on the received data. According to an embodiment, the server determines whether the network load increases or decreases based on at least one of the received predicted performance index or the performance index trend information.

In step S405, the server blocks an additional call. According to an embodiment, the server blocks more new calls if an additional load is predicted in an adjacent cell.

In step S406, the server reactivates smaller cells previously deactivated. According to an embodiment, the server reactivates the deactivated smaller cells.

In step S407, the server triggers a server based application optimization technique. According to an embodiment, the server triggers a server based application optimization scheme (decreasing traffic load) which increases or decreases traffic load.

In step S408, the server initiates a technique for suggesting usage in a specific region. According to an embodiment, the server initiates the usage of the application program in the region according to a regional performance index.

The method according to the embodiment of FIG. 4 has the following drawbacks.

(1) The method according to the embodiment of FIG. 4 does not include contents of resolving constraints requiring considerable memory and computational resources for KPI prediction.

(2) The KPI prediction does not guarantee accuracy of prediction results due to characteristics of the prediction, and the method according to the embodiment of FIG. 4 does not include a solution if the prediction is wrong.

(3) The method according to the embodiment of FIG. 4 is not considering factors (e.g., cell coverage information, etc.) to be considered in a load balancing operation besides the KPI required for the load prediction.

(4) The method according to the embodiment of FIG. 4 does not include a method of adjusting and resolving a handover parameter, in the method of resolving the load balance.

(5) The method according to the embodiment of FIG. 4 applies a scheme for resolving the load balance, but does not include a solution if traffic load imbalance is not resolved.

To address the above-described problems, the method suggested in embodiments of FIG. 5 through FIG. 9 below may efficiently predict load imbalance occurrence between frequency bands in a mobile communication network, and thus prevent deterioration of a communication service quality of experience resulting from the load imbalance.

Hereafter, the server according to the embodiments of FIG. 5 through FIG. 9 includes the following four functions.

Figure 5:
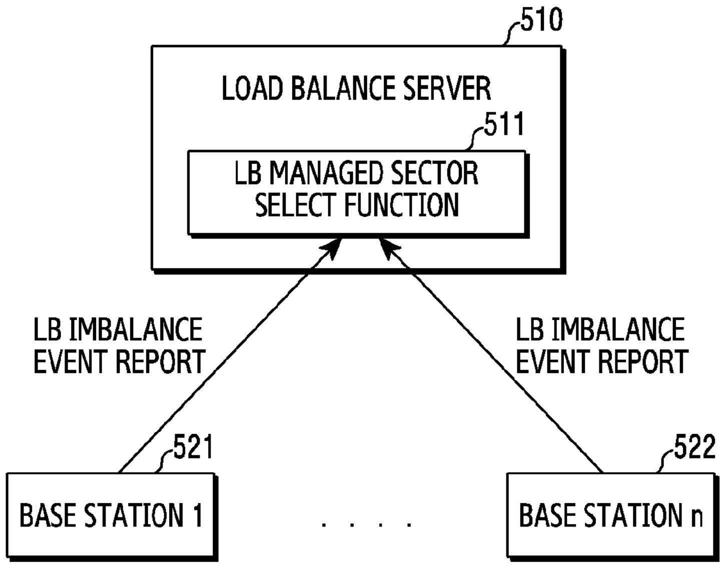
FIG. 5 illustrates operations of a load balance server in a wireless communication system according to various embodiments of the present disclosure.

(1) Load balance (LB) managed sector select function
(2) Load imbalance prediction function
(3) LB parameter selecting function
(4) LB parameter rule set monitoring function FIG. 5 illustrates operations of a load balance server in a wireless communication system according to various embodiments of the present disclosure.

The embodiment of FIG. 5 illustrates the LB managed sector select function of the server according to various embodiments of the present invention.

Referring to FIG. 5, an LB server 510 includes an LB managed sector select function 511. Each of base stations 521 and 522 transmits an LB imbalance event report to the LB managed sector select function 511 in the LB server 510.

The base stations 521 and 522 performing communication of each sector (hereafter, the sector and the base station are used interchangeably) monitor load imbalance (KPI required to determine load imbalance_) between cells (hereafter, referred to as coverage overlapped cells) overlapping in communication coverage and using different frequency bands.

The KPI imbalance determination is performed by observing the following KPI of the coverage overlapped cells.

(1) radio resource control (RRC) connected UE number imbalance
(2) active UE number imbalance
(3) internet protocol (IP) throughput imbalance per UE
(4) radio resource utilization imbalance If the load imbalance of the coverage overlapped cells occurs as a result of observation, each sector reports this to the LB server. At this time, the observed KPI is included in the report.

The LB server 510 selects an LB target managed sector based on a load imbalance event past history of the whole sectors. The selection scheme may select the managed sector by considering an occurrence frequency and a degree of the load imbalance within past several weeks of a corresponding sector.

Figure 6:
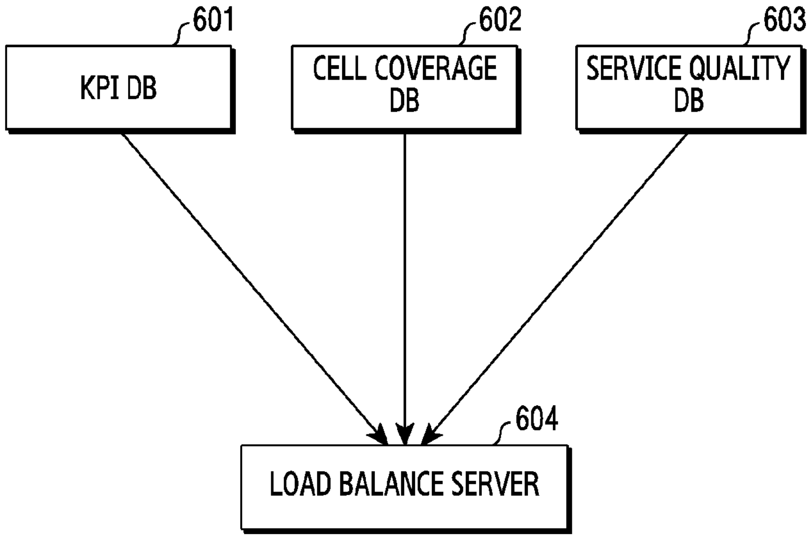
FIG. 6 illustrates operations of a load balance server for collecting sector information from a data base in a wireless communication system according to various embodiments of the present disclosure.

FIG. 6 illustrates operations of an LB server for collecting sector information from a data base in a wireless communication system according to various embodiments of the present disclosure.

The embodiment of FIG. 6 illustrates the load imbalance prediction function of the server according to various embodiments of the present invention.

An LB server 604 fetches past (e.g., previous 4 weeks) information collected from data bases which store a KPI which is LB related information of coverage overlapped cells of the managed sector selected in the embodiment of FIG. 5, coverage overlap, and service quality information.

The load imbalance prediction function of the LB server 604 predicts future (e.g., 7 days later) hourly LB related information of the managed sector on a periodic basis (e.g., every 7 days) based on the past information and predicts whether future hourly load imbalance occurs based on this.

For doing so, the load imbalance prediction function of the LB server 604 has three detailed prediction functions to be described with reference to FIG. 7.

Figure 7:
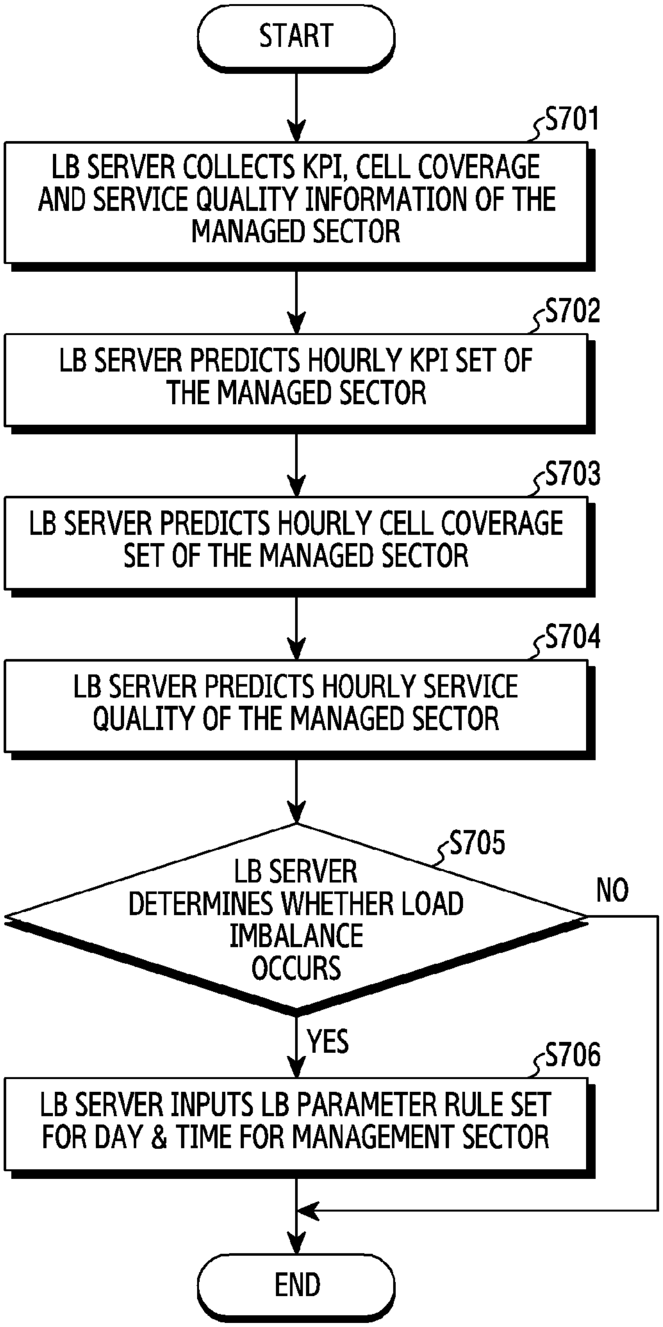
FIG. 7 illustrates operations of performing load imbalance prediction in a wireless communication system according to various embodiments of the present disclosure.

FIG. 7 illustrates operations of performing load imbalance prediction in a wireless communication system according to various embodiments of the present disclosure.

Referring to FIG. 7, the LB server collects a sector KPI, cell coverage and service quality information, and then predicts a hourly KPI set, a hourly cell coverage set, and a hourly service quality set of the managed sector.

Specifically, in step S701, the LB server collects the KPI, the cell coverage and the service quality information of the managed sector.

In step S702, the LB server predicts the hourly KPI set of the managed sector.

In step S703, the LB server predicts the hourly cell coverage set of the managed sector.

In step S704, the LB server predicts the hourly service quality of the managed sector.

In step S705, the LB server determines whether the load imbalance occurs. If predicting that the load imbalance occurs, it proceeds to step S706, and if predicting that the load imbalance will not occur, it terminates the procedure.

In step S706, the LB server inputs an LB parameter rule set for day and time for the management sector.

In the embodiment of FIG. 7, each prediction function of the LB server predicts hourly information until the future (e.g., one week later) based on past information of the target sector. The prediction may be conducted with a plurality of candidate information sets to increase prediction reliability.

(1) hourly KPI information predictor
(2) hourly coverage overlap information predictor
(3) hourly service quality information predictor Each prediction function may predict the future information using the following methods.

(1) artificial intelligence (AI) based time series prediction model
(2) statistical scheme The load imbalance prediction function determines whether the load imbalance occurs or not based on the predicted hourly KPI of the coverage overlapped cells, the hourly coverage overlap information and the service quality information. A criterion for determining the load imbalance of the coverage overlapped cells may be as follows.

Figure 8:
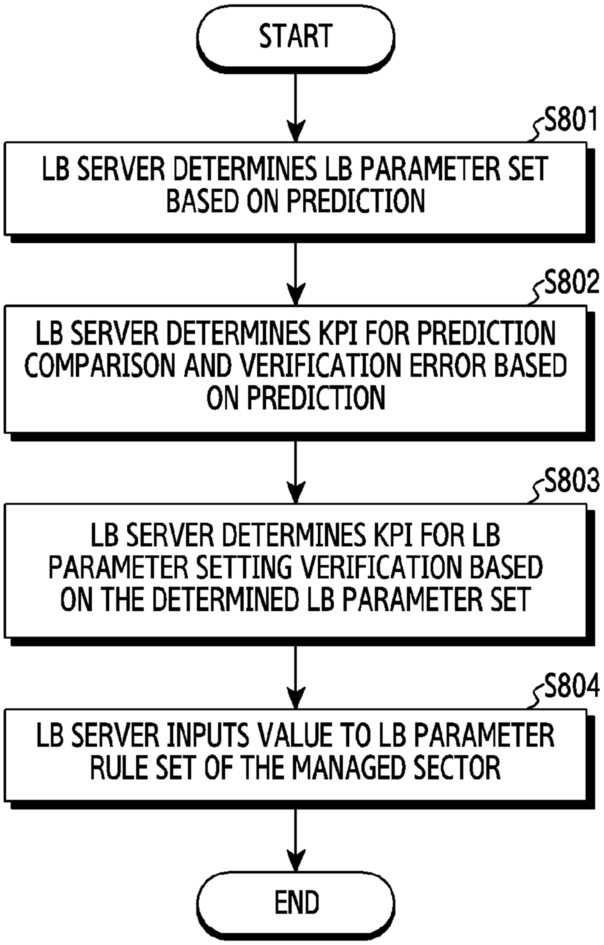
FIG. 8 illustrates operations of a load balance parameter selecting function in a wireless communication system according to various embodiments of the present disclosure.

(1) KPI imbalance
(1-1) RRC connected UE number imbalance
(1-2) active UE number imbalance
(1-3) IP throughput imbalance per UE
(1-4) radio resource utilization imbalance
(1-5) base station queue delay imbalance
(1-6) load metric calculated by combining the above
(2) imbalance of service quality (quality of experience (QoE) per frequency band)
(2-1) voice service QoE imbalance
(2-2) video service QoE imbalance
(2-3) Other service QoE imbalance FIG. 8 illustrates operations of an LB parameter selecting function in a wireless communication system according to various embodiments of the present disclosure.

The embodiment of FIG. 8 illustrates the LB parameter selecting function of the server according to various embodiments of the present invention.

Referring to FIG. 8, in step S801, the LB server determines an LB parameter set based on prediction.

In step S802, the LB server determines a KPI for prediction comparison and verification error based on the prediction.

In step S803, the LB server determines a KPI for the LB parameter setting verification based on the determined LB parameter set.

In step S804, the LB server inputs a value to the LB parameter rule set of the managed sector.

A sector in which load imbalance is predicted to occur selects LB parameter rule sets including one or a plurality of LB parameter rules suitable for prediction information sets of the coverage overlapped cells. If a plurality of candidate information sets is predicted in the embodiment of FIG. 7, an LB parameter rule may be found for each prediction result. That is, a plurality of LB parameter rules may be found.

Before the predicted load imbalance occurs, the LB server makes the searched LB parameters setting rule set in the predicted sector, to apply the LB parameters to be applied to the predicted sector in advance. By referring to the time at which the load imbalance is predicted to occur, before the predicted load imbalance occurs, the LB server transfers the LB parameter rule set to the sector in advance, to thus allow the sector to change the LB parameter before the load imbalance occurs.

The managed sector sets an LB parameter of a high priority LB parameter rule at the time at which the load imbalance is predicted to occur, which is designated by the received LB parameter rule set, as the LB parameter of the sector.

The LB parameter rule set includes each item of the following [Table 1].

TABLE 1

| Items | Meaning |
|---|---|
| Sector id | Managed sector identifier |
| Predicted LB occur time | Data & time |
| LB rule id | Identifier for case including a plurality of LB parameter set rule |
| LB rule priority | Priority which informs the Rule to be applied first to Sector |
| LB parameter set | LB parameter value set to set by Rule |
| KPI for prediction comparison | Prediction KPI value per Rule, per KPI (e.g. RRC UE of sector, ACT UE of sector, Traffic load, Cell Coverage) |
| KPI for prediction verification error threshold | criteria of determining for reporting KPI prediction error by KPI, by rule |
| KPI for LB parameter setting verification | Expected KPI after setting LB parameter, by Rule, by KPI (e.g. RRC UE of each cell, ACT UE of each cell, Radio Resource block utilization of each cell, IP Throughput of each cell) |
| KPI for LB parameter setting verification error threshold | Judgment criteria whether the selecting error reports by Rule, by KPI |

[Table 1] shows the configuration of the LB parameter rule set.

One LB parameters rule is combinations of the priority between frequency bands set in each cell and handover related thresholds, and may include the following contents.

(1) A1 TRIGGER_QUANTITY: A1 threshold (RSRP/RSRQ)

(2) A2 TRIGGER_QUANTITY: A2 threshold (RSRP/RSRQ)

(3) A3 TRIGGER_QUANTITY: A3 threshold (RSRP/RSRQ)

(4) A5 TRIGGER_QUANTITY: A5 threshold (RSRQ/RSRQ)

(5) frequency band priority (6) expected cell capacity (7) load balancing scheme activation threshold If the LB parameter rule set includes a plurality of rules, the LB rule priority uses to designate the rule to be applied first to the LB parameter setting of the base station among the plurality of the rules. If an error occurs in the high priority rule through the verification, the base station performs the LB parameter setting by selecting the most similar rule to the current situation among other low priority rules than the high priority rule.

The KPI for prediction comparison among the items of the LB parameter rule set is a KPI list used to determine the prediction performance, by comparing the KPI prediction result of the LB server and the actual monitoring result, that is, a parameter list. These include KPIs irrespective of the LB parameter settings such as the RRC connected UE number, the active UE number, and the cell coverage.

The KPI for LB parameter setting verification among the items of the LB parameter rule set is KPIs for determining the performance of the LB parameter setting, by comparing the expected performance and the actual monitored performance of the LB parameter selecting of the LB server.

In addition, the LB parameter rule set includes a verification error threshold for each KPI for verifying the error of the KPI for prediction comparison and the actual KPI.

Figure 9:
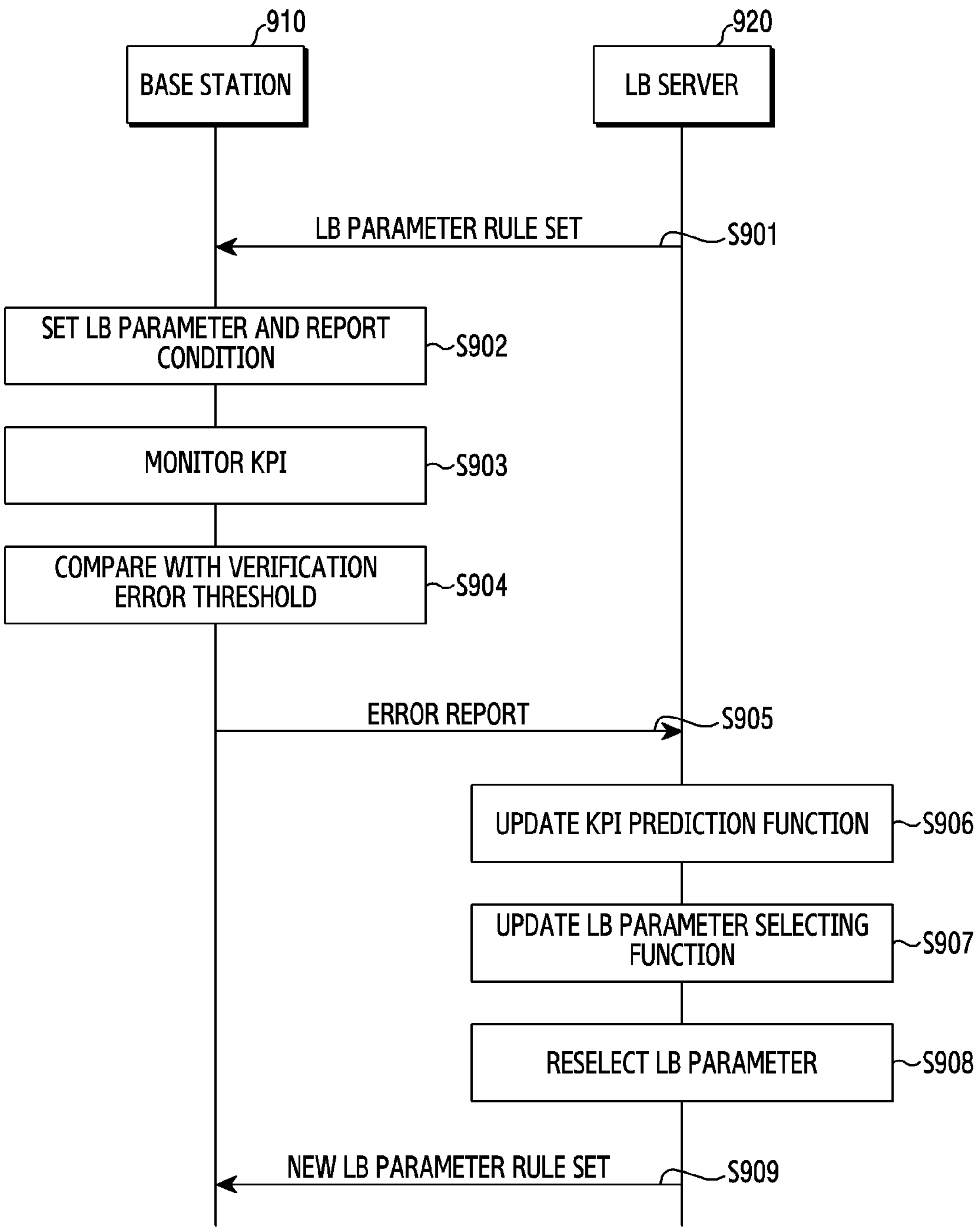
FIG. 9 illustrates operations of a load balance parameter rule set monitoring function in a wireless communication system according to various embodiments of the present disclosure.

FIG. 9 illustrates operations of an LB parameter rule set monitoring function in a wireless communication system according to various embodiments of the present disclosure.

The embodiment of FIG. 9 illustrates the LB parameter rule set monitoring function of a server according to various embodiments of the present invention.

Referring to FIG. 9, in step S901, an LB server 920 transmits an LB parameter rule set to a base station 910.

In step S902, the base station 910 sets an LB parameter and an error occurrence report condition.

In step S903, the base station 910 monitors the KPI.

In step S904, the base station 910 compares with a verification error threshold.

According to an embodiment, the base station 910 sets the LB parameter at a set time according to the received LB parameter rule set, and monitors the KPI.

The base station 910 calculates the error by comparing a KPI for prediction comparison of the set rule with an actual hourly KPI and hourly cell coverage information.

If the error of the KPI for prediction comparison of the rule set by the current base station 910, that is, the high priority rule and the actual KPI exceeds each verification error threshold, the base station 910 compares the KPI for prediction comparison of the actual KPI with the low priority rule with the verification error threshold, obtains the low priority rule similar to the current KPI, and changes the base station LB parameter set to the LB parameter set of the low priority rule.

In step S905, the base station 910 reports the error to the LB server 920.

According to an embodiment, if the error of the LB parameter selection performance determination KPI and the actual KPI exceeds the verification error threshold, the base station 910 immediately reports the error to the LB server 920.

In step S906, the LB server 920 updates the KPI prediction function.

In step S907, the LB server 920 updates the LB parameter selecting function.

In step S908, the LB server 920 reselects the LB parameter.

In step S909, the LB server 920 transmits the new LB parameter rule set to the base station 910.

According to an embodiment, the LB server 920 reflects each error in correcting 'hourly KPI information predictor' and 'hourly coverage overlap predictor'. The LB server 920 generates an LB parameter rule based on the current KPI reported by the base station 910 and transmits it to the base station 910.

The base station 910 receiving the LB parameter rule generated based on the current KPI immediately reflects the received LB parameter rule.

The method according to various embodiments of the present invention has the following effects.

(1) By means of the "LB managed sector select function", the memory and the computation power of the LB server may be efficiently used. Hence, more base stations may be supported with each server.

(2) By means of the "load imbalance prediction function", it is possible to predict the accurate load imbalance using the past information from various information sources. Hence, it is possible to take a preemptive measure before the load imbalance occurs.

(3) By means of the "load imbalance prediction function", it is possible to detect the load imbalance based on the service quality index as well as the KPI of the base station.

(4) If an error occurs in the prediction through the rule set scheme of the "LB parameter selecting function", it may be immediately handled.

(5) The prediction function and the LB parameter rule selecting function may be updated through the error report function of the "load parameter rule set monitoring function".

(6) If an error occurs, it may be handled quickly through the error report function of the "load parameter rule set monitoring function".

According to various embodiments of the present invention, the server has the following functions.

(1) A function of selecting an LB parameter selecting target sector based on a load imbalance record (2) A function of collecting related information from a KPI data base (DB), a cell coverage DB, and a service quality DB (3) A function of predicting KPI, cell coverage, and service quality, and selecting an LB parameter based on the prediction (4) A function of selecting KPI items for error verification and an error threshold (5) A function of receiving a prediction error occurrence report from the base station (6) A function of immediately reselecting the LB parameter based on the received prediction error report and transferring them to a corresponding sector (7) A function of correcting the predictor and the LB parameter selecting function by reflecting the prediction error According to various embodiments of the present invention, the base station has the following functions.

(1) A function of receiving the LB parameter rule set from the LB server, and accordingly changing the LB parameter (2) A function of reporting to the LB server if the load imbalance occurs (3) A function of comparing the predicted KPI with the current KPI and verifying their error (4) A function of reporting an error comparison result to the LB server The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the components included in the present disclosure are expressed in a singular or plural form. However, the singular or plural expression is appropriately selected according to a proposed situation for the convenience of explanation, the present disclosure is not limited to a single component or a plurality of components, the components expressed in the plural form may be configured as a single component, and the components expressed in the singular form may be configured as a plurality of components.

Meanwhile, while the specific embodiment has been described in the detailed explanations of the present disclosure, it will be noted that various changes may be made therein without departing from the scope of the present disclosure. Therefore, the scope of the present disclosure is not limited and defined by the described embodiment and is defined not only the scope of the claims as below but also their equivalents.

The present disclosure generally relates to a wireless communication system, and more particularly, to a method and an apparatus for predicting a communication network load and performing load balancing in the wireless communication system.

The invention claimed is:

1. A method performed by a server in a wireless communication system, comprising:

receiving key performance index (KPI) information, cell coverage information and service quality information of a base station of a sector managed from a KPI data base (DB), a cell coverage DB, and a service quality DB;

generating, using a KPI prediction function, a predicted KPI, predicted cell coverage and predicted service quality information of the base station based on the KPI information, the cell coverage information and the service quality information;

identifying whether a load imbalance occurs in the base station based on the predicted KPI, the predicted cell coverage and the predicted service quality information;

identifying, using a load balance (LB) parameter selecting function based on identifying that the load imbalance is predicted to occur, an LB parameter rule set associated with the load imbalance, wherein the LB parameter rule set includes a plurality of LB parameter rules, a plurality of LB parameter sets corresponding to the plurality of LB parameter rules, priority information associated with each of the plurality of LB parameter rules, one or more KPIs associated with each of the plurality of LB parameter rules, and a plurality of verification error thresholds;

transmitting the LB parameter rule set to the base station, receiving, from the base station, a prediction error occurrence report associated with the LB parameter rule set;

updating, based on the received prediction error occurrence report, the KPI prediction function and the LB parameter selecting function;

identifying, using the updated LB parameter selecting function, a new LB parameter rule set including one or more new LB parameters; and transmitting the new LB parameter rule set to the base station, wherein, for a time at which the load imbalance is predicted to occur, an LB parameter set corresponding to an LB parameter rule of a highest priority among the plurality of LB parameter rules is applied to the base station based on the priority information, and wherein the prediction error occurrence report includes an error determined by comparing a KPI associated with the LB parameter rule of the highest priority and an actual KPI and an actual cell coverage.

2. The method of claim 1, further comprising:

receiving load imbalance event related information from one or more base stations of one or more sectors;

determining whether a load imbalance occurs based on the load imbalance event related information; and determining the managed sector based on an occurrence frequency of the load imbalance.

3. The method of claim 1, further comprising:

reselecting the one or more new LB parameters based on the updated KPI prediction function and the updated LB parameter selecting function.

4. The method of claim 1, wherein the LB parameter set applied to the base station is changed to another LB parameter set among the plurality of LB parameter sets in case that the error exceeds at least one of the plurality of verification error thresholds.

5. A method performed by a base station of a sector in a wireless communication system, comprising:

receiving, from a server, a load balance (LB) parameter rule set including information associated with a load imbalance predicted to occur, wherein the LB parameter rule set includes a plurality of LB parameter rules, a plurality of LB parameter sets corresponding to the plurality of LB parameter rules, priority information associated with each of the plurality of LB parameter rules one or more KPIs associated with each of the plurality of LB parameter rules, and a plurality of verification error thresholds, applying, for a time at which the load imbalance is predicted to occur, an LB parameter set corresponding to an LB parameter rule of a highest priority among the plurality of LB parameter rules based on the priority information;

monitoring a key performance index (KPI);

generating, based on a monitoring result, a prediction error occurrence report associated with the LB parameter rule set, the prediction error occurrence report including an error determined by comparing a KPI associated with the LB parameter rule of the highest priority and an actual KPI and an actual cell coverage;

transmitting the prediction error occurrence report to the server; and receiving, from the server, a new LB parameter rule set including one or more new LB parameters, wherein a KPI prediction function and the LB parameter selecting function of the server are updated based on the prediction error occurrence report, and wherein the new LB parameter rule set is identified using the updated LB parameter selecting function.

6. The method of claim 5, further comprising:

changing the LB parameter set applied to the base station to another LB parameter set among the plurality of LB parameter sets in case that the error exceeds at least one of the plurality of verification error thresholds.

7. The method of claim 5, further comprising:

transmitting load imbalance event related information of the base station of the sector to the server.

8. A server in a wireless communication system, comprising:

a transceiver; and at least one processor operable coupled to the transceiver, wherein the at least one processor is configured to:

receive key performance index (KPI) information, cell coverage information and service quality information of a base station of a sector managed from a KPI data base (DB), a cell coverage DB and a service quality DB, generate, using a KPI prediction function, a predicted KPI, predicted cell coverage, and predicted service quality information of the base station based on the KPI information, the cell coverage information, and the service quality information, identify whether a load imbalance occurs in the base station based on the predicted KPI, the predicted cell coverage and the predicted service quality information, identify, using a load balance (LB) parameter selecting function based on identifying that the load imbalance is predicted to occur, an LB parameter rule set associated with the load imbalance, wherein the LB parameter rule set includes a plurality of LB parameter rules, a plurality of LB parameter sets corresponding to the plurality of LB parameter rules, priority information associated with each of the plurality of LB parameter rules, one or more KPIs associated with each of the plurality of LB parameter rules, and a plurality of verification error thresholds, transmit the LB parameter rule set to the base station, receive, from the base station, a prediction error occurrence report associated with the LB parameter rule set, update, based on the received prediction error occurrence report, the KPI prediction function and the LB parameter selecting function, identify, using the updated LB parameter selecting function, a new LB parameter rule set including one or more new LB parameters, and transmit the new LB parameter rule set to the base station, wherein, for a time at which the load imbalance is predicted to occur, an LB parameter set corresponding to an LB parameter rule of a highest priority among the plurality of LB parameter rules is applied to the base station based on the priority information, and wherein the prediction error occurrence report includes an error determined by comparing a KPI associated with the LB parameter rule of the highest priority and an actual KPI and an actual cell coverage.

9. The server of claim 8, wherein the at least one processor is further configured to:

receive load imbalance event related information from one or more base stations of one or more sectors, determine whether a load imbalance occurs based on the load imbalance event related information, and determine the managed sector based on an occurrence frequency of the load imbalance.

10. The server of claim 8, wherein the at least one processor is further configured further to:

reselect the one or more new LB parameters based on the updated KPI prediction function and the updated LB parameter selecting function.

11. The server of claim 8, wherein the LB parameter set applied to the base station is changed to another LB parameter set among the plurality of LB parameter sets in case that the error exceeds at least one of the plurality of verification error thresholds.

* * * * *